United States Patent
Mol et al.

(10) Patent No.: US 8,316,723 B2
(45) Date of Patent: Nov. 27, 2012

(54) COMBINATION OF BEARING COMPONENT AND SENSOR

(75) Inventors: Hendrik Anne Mol, XG Sleeuwijk (NL); Johannes Franciscus Van Den Sanden, DT Nieuwegein (NL)

(73) Assignee: Aktiebolaget SKF, Gothenburg (SE)

( * ) Notice: Subject to any disclaimer, the term of this patent is extended or adjusted under 35 U.S.C. 154(b) by 224 days.

(21) Appl. No.: 12/740,949

(22) PCT Filed: Oct. 31, 2008

(86) PCT No.: PCT/EP2008/009211
§ 371 (c)(1),
(2), (4) Date: Jun. 17, 2010

(87) PCT Pub. No.: WO2009/056334
PCT Pub. Date: May 7, 2009

(65) Prior Publication Data
US 2010/0251810 A1    Oct. 7, 2010

(30) Foreign Application Priority Data

Nov. 2, 2007  (WO) ................. PCT/EP2007/009513

(51) Int. Cl.
*B25B 23/14* (2006.01)
(52) U.S. Cl. ..................................... 73/862.322; 73/850
(58) Field of Classification Search ............ 73/760, 73/862.08, 850, 862.322
See application file for complete search history.

(56) References Cited

U.S. PATENT DOCUMENTS

| 4,112,751 | A |  | 9/1978 | Grünbaum |
| 5,658,082 | A | * | 8/1997 | Tsushima et al. ............. 384/492 |
| 5,735,048 | A | * | 4/1998 | Peters ...................... 29/898.045 |
| 7,152,484 | B2 |  | 12/2006 | Meyer et al. |
| 7,192,041 | B2 |  | 3/2007 | Nicot et al. |
| 2002/0191878 | A1 |  | 12/2002 | Ueda et al. |
| 2006/0288794 | A1 |  | 12/2006 | Hardwicke et al. |
| 2007/0022809 | A1 |  | 2/2007 | Yoshida et al. |
| 2009/0180722 | A1 |  | 7/2009 | Dougherty et al. |

FOREIGN PATENT DOCUMENTS

| CN | 2308089 Y | 2/1999 |
| CN | 1571888 A | 1/2005 |
| DE | 10 2007 011 878 A1 | 9/2008 |
| EP | 1 225 353 A1 | 7/2002 |
| EP | 1 626 260 A | 2/2006 |
| EP | 1 921 335 A1 | 5/2008 |
| FR | 2 909 759 A | 6/2008 |
| WO | WO 03/029656 A1 | 4/2003 |
| WO | WO 2007/018072 A1 | 2/2007 |
| WO | WO 2007/103915 A2 | 9/2007 |
| WO | WO 2007/107293 A1 | 9/2007 |
| WO | WO 2007103915 A2 * | 9/2007 |

OTHER PUBLICATIONS

*International Search Report (PCT/ISA/210) issued on Mar. 9, 2009 by Japanese Patent Office as the International Searching Authority for International Application No. PCT/EP2008/009211.
*Written Opinion (PCT/ISA/237) issued on Mar. 9, 2009 by Japanese Patent Office as the International Searching Authority for International Application No. PCT/EP2008/009211.
English language translation of Chinese Office Action issued Feb. 15, 2012 by the Chinese Patent Office in Chinese Patent Application No. 200880123803.9.

* cited by examiner

*Primary Examiner* — Max Noori
(74) *Attorney, Agent, or Firm* — Buchanan Ingersoll & Rooney PC

(57) ABSTRACT

A combination of a bearing component and a sensor, wherein: (a) at least a portion of the bearing component is formed from a bearing steel; (b) the sensor comprises a sensor element and a support therefor; (c) at least a portion of the support is formed from a low carbon steel comprising no more than 0.2 wt. % carbon or from nickel or an alloy thereof or from titanium or an alloy thereof; and (d) the bearing component and the support are welded or brazed to one another via said respective portions.

32 Claims, No Drawings

COMBINATION OF BEARING COMPONENT AND SENSOR

TECHNICAL FIELD

The present invention concerns a bearing and, in particular, a sensor for measuring operating parameters of a bearing such as stresses and strains.

BACKGROUND

Bearings are devices that permit constrained relative motion between two parts. They may be used in many different types of machinery to retain and support rotating components such as, for example, a wheel on a vehicle, a vane on a windmill or a drum in a washing machine. A typical bearing comprises inner and outer rings and a plurality of rolling elements, and may further comprise a cage to retain the rolling elements.

During use, the bearing is subjected to different loads, both static and dynamic. The static load is mainly due to the weight supported by the bearing and may also be due to a preload with which the bearing is mounted. The dynamic loads are time-dependent and are due to the operating conditions.

In many systems, it is desirable to be able to monitor the load acting on a bearing. In modern vehicles, for example, load data from the wheel bearings are used in the control of vehicle stability systems. Vibration is another physical parameter that is important with regard to bearings, as it provides an indication of the 'health' of a bearing. Excessive vibration may be a sign that a bearing is nearing the end of its life, and so bearings in vital machinery are often provided with sensors to monitor vibration.

Displacement sensors such as strain gauges are commonly applied to measure load and deformation, while thin film piezoelectric transducers may be used as vibration sensors. Preloaded piezoelectric sensors can also be used as displacement sensors, which involves clamping the sensor to e.g. a bearing ring.

A widely applied method of attaching a sensor to a bearing component is adhesive bonding. This method has a number of drawbacks. The surface of the bearing component needs to be cleaned and pretreated, and the adhesive may need to cure for several hours before it has stabilized.

The present invention aims to address at least some of the problems associated with the prior art and to provide an improved combination of a bearing component and a sensor.

SUMMARY

Accordingly, the present invention provides a combination of a bearing component and a sensor, wherein:

(a) at least a portion of the bearing component is formed from a bearing steel;

(b) the sensor comprises a sensor element and a support therefor;

(c) at least a portion of the support is formed from a low carbon steel comprising no more than 0.2 wt. % carbon or from nickel or an alloy thereof or from titanium or an alloy thereof; and (d) the bearing component and the support are welded or brazed to one another via said respective portions.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

In one preferred embodiment, the bearing steel comprises at least 0.4 wt. % carbon, more preferably from 0.5 to 0.8 wt. % carbon. In one advantageous aspect of this embodiment, the bearing steel comprises from 0.5 to 0.6 wt. % carbon. In another advantageous aspect, the bearing steel comprises from 0.65 to 0.75 wt. % carbon.

In another preferred embodiment, the bearing steel comprises at least 0.8 wt. % carbon, more preferably from 0.7 to 1.3 wt. % carbon, still more preferably from 0.8 to 1.2 wt. % carbon.

The bearing steel preferably comprises up to 2 wt. % chromium, more preferably from 1.2 to 1.8 wt. % chromium, still more preferably from 1.3 to 1.6 wt. % chromium.

Preferred commercial examples of bearing steels for use in the present invention include AISI 1055, AISI 1070, 41Cr4, 34CrNiMo6 and SAE 51200 (100Cr6). Other examples include DIN 100CrMo7-3, DIN 100CrMnMo7, DIN 100CrMo7-4 and DIN 100CrMnMo8. For higher loads and elevated temperature applications, M50 tool steel may be used. Case hardened or carburised grades may also be used and examples include 16MnCr5 and 21MnCr5.

The support for the sensor is formed from either (i) a low carbon steel, or (ii) nickel or an alloy thereof, or (iii) from titanium or an alloy thereof. The preferred material is (i) or (ii), with (i) being the most preferred.

A preferred low carbon steel is a stainless steel.

The low carbon steel preferably comprises no more than 0.1 wt. % carbon, more preferably no more than 0.08 wt. % carbon, still more preferably no more than 0.05 wt. % carbon.

The low carbon steel preferably comprises from 10 to 25 wt. % chromium, more typically from 12 to 20 wt. % chromium, still more typically from 13 to 19 wt. % chromium. A chromium content of 12 wt. % or more, preferably 15 wt. % or more, has been found to be beneficial in terms of joining the sensor element to the support, which is preferably via one or more dielectric interlayers, such as a glass or glass-containing layer(s).

The support is preferably formed from a low carbon steel comprising from 2 to 16 wt. % nickel. One suitable range is from 7 to 15 wt. % nickel, more typically from 8 to 14 wt. % nickel. In these ranges, nickel contents of from 8-10.5 wt. % or from 10-14 wt. % are preferred. Another suitable range is from 2 to 6 wt. % nickel, more typically from 3 to 5 wt. % nickel. Steels comprising nickel in an amount of no more than 0.75 wt. % may also be used.

The metal support may be in the form of a simple sheet or may have a particular shape, configuration or profile so as to match the surface of the bearing to which it will be attached by welding/brazing and/or to take account of the type of measurement in question. The support is formed from sufficiently thick gauge (typically $\geq 0.5$ mm) so as to have the required rigidity for the application in question. A preferred method of manufacturing the support is by powder metallurgy.

Preferred commercial examples of steel materials for the support include AISI 304, AISI 304L, AISI 316, AISI 316L, AISI430 and 17-4PH. Other examples include heat-treatable steels such as DIN42Cr4, 50CrMo4 and 34CrNiMo6.

Alternatively, the support may be formed from electrodeposited and etched nickel or an alloy thereof.

The sensor will typically be a displacement sensor and may comprise one or more strain gauges which convert mechanical displacement into an electrical signal. Thus one or more sensor elements may be provided to function as strain gauge(s). These may be formed from, for example, a resistor material or a semiconductor material. Examples of resistor materials are metals, metal oxides and ceramics. Specific examples include ruthenium oxide, tantalum nitride, lead oxide, bismuth ruthenate, bismuth iridate and nickel-chromium. A suitable example of a semiconductor material is silicon or an oxide thereof.

In a preferred embodiment, the strain sensitive resistors are directly printed on to the metal support using conventional screen-printing techniques.

For thick film resistors, the film may also be deposited on to the support using conventional screen-printing technology. To facilitate this process, the aforementioned metal oxide and ceramic materials may, for example, be mixed with additional ingredients such as a glass powder and a liquid carrier. The conductive ceramic composition is then fused at a temperature of typically 750 to 950° C. For a number of resistive ceramics (eg ruthenium oxide), it is preferable to deposit them on one or more dielectric layers since this has been found to result in an improved bond with the low carbon steels as herein described. For this reason, the support for the sensor may comprise a coated substrate, wherein the coating comprises one or more dielectric layers such as, for example, glass, a glass-containing material or a metal oxide, such as aluminium oxide.

Thin film resistors may also be made by sputtering (eg vacuum deposition) the resistive material on to the support. The thin film is then etched in a process akin to making printed circuit boards.

If desired, thick and thin film resistors may be trimmed to an accurate value by abrasive or laser trimming.

Semiconductor gauges may be fabricated in silicon wafers which may be as thin as 100 micrometers. The gauges are very small and one 15 cm wafer may carry as many as 15000 sensors. If it is desired to have a semiconductor strain gauge on the support, then a glass or glass-containing interlayer may advantageously be used to facilitate attachment of the silicon to the support material. The glass may then be sintered at a temperature typically from 500 to 600° C. Semiconductor strain gauges are advantageous in that they are very small and have large gauge factors. However, they also have strong temperature sensitivity and this needs to be compensated with dedicated circuits and algorithms.

The strain gauge pattern may be chosen so as to offer measurement of tension, compression and/or shear.

The metal support may be in the form of a simple sheet or may have a particular shape, configuration or profile so as to match the surface of the bearing to which it will be attached by welding/brazing and/or to take account of the type of measurement in question. The support is formed from sufficiently thick gauge (typically $\geq 0.5$ mm) so as to have the required rigidity for the application in question.

The bearing component may be part of a rolling element bearing, for example the bearing inner or outer ring. The bearing component could also be part of a linear bearing such as ball and roller screws.

The present invention also provides a bearing comprising a combination as herein described. It will be understood that the bearing may comprise one or more sensors. In particular, bearings that measure loads in more than one degree of freedom will require more than one strain gauge.

The present invention provides a combination of a bearing and a sensor, for example a displacement sensor comprising one or more strain gauges, which is capable of measuring elastic deformation, forces and moments and which produces an accurate, strong and reliable signal. Sensor response is predictable and sensitive enough for use on load sensing bearings.

The bearing component and the support for the sensor element are welded or brazed to one another. Laser welding, electron beam welding and laser brazing are preferred, particularly laser welding. Pressure-based welding is another possibility and electrical resistance, friction welding or magnetic discharge welding may, for example, also be used where appropriate. A welded or brazed connection has been found to result in improvements in measurements and also reliability.

A filler material is advantageously used to improve the welding process and weld quality. For the bearing steels and low carbon steels used in the present invention and described herein, particularly good results in terms of weld performance and integrity are obtained if a nickel or nickel-containing filler is used.

The nickel or nickel alloy may act to increase the ductility of the fusion zone and the heat affected zone and may also mitigate differences in the expansion coefficient of the materials being welded. Examples of suitable fillers include AWS A5.15, E308L-16 and E316L-16. Alternatively, ERNiCrMo-3, ERNiCr3NiCu-7 or ERNi1 may be used. A Ni—Ti alloy is preferred, containing preferably from 1 to 10 wt. % Ti, more preferably from 1 to 5 wt. % Ti.

The filler material may be applied to the weld position in a number of ways. For example, the filler may be joined to one of the components to be welded as a relatively thin platelet or coating. Also it is possible to supply the filler during the welding process, for example as a wire. In another embodiment, the filler may be pre-mounted as feet on the legs of the sensor carrier.

In the case of brazing, copper and silver, including alloys thereof, are examples of suitable filler materials.

It is often beneficial to pre- or post-heat-treat the components. In general, the maximum temperature of the complete bearing should not exceed 100° C. Post-weld stress relief or tempering may be beneficial for certain sensor support materials, for example 17-4PH.

Local pre- and post-heat-treatments may be achieved, for example, by a laser beam, resistance or induction heating, or the use of a hot contact member such as a soldering iron.

In the present invention the composition for the support is carefully chosen so as to be compatible with the bearing steel (for example 100Cr6 (=SAE 51200), AISI 1055 and AISI 1070) in terms of alloy chemistry, weldability/brazability and physical properties. In particular, in the operating temperature range of a particular bearing application (e.g. from 40-60° C.), the coefficient of thermal expansion of the support and of the bearing steel are advantageously selected to be as close as possible. The composition must also be compatible with the material forming the sensor element (for example thick and thin film resistors and semiconductor materials) and the related forming processes. The inventors have found that low carbon steels as herein described, such as those comprising from 10 to 25 wt. % chromium, are particularly good in these respects and offer a fine balance between bonding strength to the bearing component and the sensor material and mechanical and thermal properties. It is particularly advantageous if nickel or a nickel-containing composition (eg a Ni—Ti alloy) is used in the formation of the weld between the respective portions of the bearing component and the support. The nickel or nickel-containing composition may, for example, be provided as filler material during the welding operation.

Alternatively, or in combination, the nickel or nickel-containing composition may be pre-deposited on one or both of the respective portions of the bearing component and/or the support prior to the welding operation. This may be achieved by electrodepositing nickel or a nickel-containing composition on surface(s) of one or both of the bearing component and the support. The use of nickel or a nickel-containing composition has been found to result in improvements in measurements and also sensor reliability. It is also particularly advantageous if one or more dielectric layers are interposed between the support and the sensor element. This may be achieved by depositing a liquid or paste comprising dielectric particles on a surface of the support. Deposition may, for example, be by conventional screen printing techniques. The liquid or paste is then subjected to conventional heat treatments including, for example, firing and/or sintering to form the dielectric layer. Further dielectric layers may be built up in this way prior to depositing the sensor element on the dielectric layer(s). If desired, a final dielectric layer can then be deposited on the sensor element to form a protective seal. The dielectric layer or layers preferably comprise(s) glass or a glass-containing composition. The one or more dielectric interlayers have been found to result in improvements in measurements and sensor reliability.

The present invention will now be described further with reference to the following non-limiting examples.

EXAMPLES

Preferred low carbon steels for forming the support for the sensor include 300 series stainless steels such as AISI 304, AISI 304L, AISI 316, AISI 316L. The chemical composition of these grades (in wt. %) is provided below.

| AISI 304 | AISI 304L |
|---|---|
| C < 0.08 | C < 0.03 |
| Mn < 2.0 | Mn < 2.0 |
| Si < 1.0 | Si < 1.0 |
| P < 0.045 | P < 0.045 |
| S < 0.03 | S < 0.03 |
| Ni 8-10.5 | Ni 8-10.5 |
| Cr 18-20 | Cr 18-20 |

| AISI 316 | AISI 316L |
|---|---|
| C < 0.08 | C < 0.03 |
| Mn < 2.0 | Mn < 2.0 |
| Si < 1.0 | Si < 1.0 |
| P < 0.045 | P < 0.045 |
| S < 0.03 | S < 0.03 |
| Ni 10-14 | Ni 10-14 |
| Cr 16-18 | Cr 16-18 |
| Mo 2-3 | Mo 2-3 |

Of these alloys, grades 316L and 304L are most preferred. These are austenitic type steel having a maximum carbon content of 0.03%, a chromium content of 16 to 18% (18 to 20% in 304L), and a nickel content of 10 to 14% (8 to 10.5% in 304L). These grades have been found to be relatively resistant to carbide precipitation, which can occur around the weld spots when welded to a bearing steel such as 100Cr6. The carbides can cause brittleness of the weld when they grow too large, and decarbonisation of the bearing steel can initiate cracks. The nickel in these alloys acts as an austenite stabiliser and helps toughen the mixed fusion zone. In the event of welding, a filler material such as nickel or a nickel alloy is preferably used during the welding operation since this has been found to improve the weld performance and integrity for the steels in question.

17-4PH

Another preferred stainless steel material for the support is 17-4PH (=AISI 630), which has the following composition (in wt. %):

C 0.03-0.07
Mn<1.0
Si<1.0
P<0.04
S<0.03
Ni 3-5
Cr 15-17.5
Cu 3-5
Nb+Ta 0.15-0.45%

This steel is ferritic in the annealed state, but transforms into austenite when heated. It has been found that this steel can be readily welded to a bearing steel such as 100Cr6 and, moreover, has a thermal expansion that is similar to that of the bearing steel. In the event of welding, a filler material such as nickel or an alloy of nickel is preferably used during the welding operation.

AISI 430

Another preferred stainless steel material for the support is AISI 430, which has the following composition (in wt. %):

C<0.12
Mn 1.0
Si 1.0
P<0.04
S<0.03
Ni<0.75
Cr 16-18

This steel is a ferritic, non-hardenable plain chromium stainless steel. It has a thermal expansion that is very similar to that of a bearing steel such as 100Cr6. In the event of welding, a filler material such as nickel or an alloy of nickel is preferably used during the welding operation.

All of these alloys have also been found to be compatible with the various sensor materials and processes (eg deposition and sintering) which may be required in the formation of the sensor.

For certain resistive ceramics (eg ruthenium oxide), it may be preferable for a dielectric layer, such as an aluminium oxide coating or a glass layer, to be provided on the steel support. This improves the bond between the steel and resistive ceramic. If it is desired to have, for example, a semiconductor strain gauge on a steel support, then a glass or glass-containing interlayer may be used to facilitate attachment of the silicon to the support.

The support may be made by a powder metallurgical process. Such a process is advantageous in that it enables various shapes to be produced in a simple and convenient manner. A powder metallurgical process has the further advantage of enabling a support to be produced with various chemical compositions, i.e. a particular section of the support could be made from a different material.

The following example describes the manufacture of a sensor support and sensor element.

1. Steel Wafer Preparation

In this example, the steel type is Werkstoffnr 1.4016 (=AISI 430) and the sheet thickness is 1.00 mm. The sheet is cut with a laser to the desired size, shape and configuration.

2. Printing a Dielectric Inter-Layer

Two layers of glass insulator are then formed on the steel wafer. The glass is deposited as a thixotropic paste (SD1000 from Heraeus) using a screen printing technique. The layer is formed by conventional heat-treatments (for example drying at an elevated temperature, eg 150° C.), followed by firing, eg at 850° C.). After firing/sintering, the layer thickness is typically about 70 micrometers.

3. Printing the Conductor Layer

One layer of a Ag—Pt is then formed on the dielectric interlayers. The Ag—Pt alloy is deposited as a paste (C1076SD from Heraeus) using a screen printing technique and the layer is formed by conventional heat treatments. After sintering, the layer thickness is typically from 12.5 to 15.5 micrometers.

4. Printing the Strain Gauge Resistor Layer

Next, a resistor material (10 kOhm square type; R8941DN from Heraeus) is deposited on the dielectric interlayers using a screen printing technique. The layer is formed by conventional heat treatments. The layer thickness after sintering is typically from 22 to 28 micrometers.

5. Welding of Sensor Support to Bearing Component

As noted above, welding is advantageously achieved using a nickel or nickel alloy filler. Laser welding is a preferred welding technique to form overlaying spot welds. The average laser power is 700 W, the overlap between spots is ~50%, the spot time is 20 ms, and the frequency is 3 Hz at a lateral speed of 2.72 mm/s. It is beneficial if the laser is focused at an angle of from 15 to 45° to the horizontal since this reduces the melt pool and the HAZ in the bearing steel.

Nickel

As an alternative to using the aforementioned steel materials, a nickel support may be used. For example, a nickel plate can be produced by electroplating technology and will typically contain at least 99.9% nickel. Nickel has been found to be compatible with the bearing steel particularly as far as weldability is concerned. Moreover, the Young's modulus and the thermal coefficient of expansion are similar to those of a typical bearing steel (eg 100Cr6).

A number of aspects/embodiments of the invention have been described. It is to be understood that each aspect/embodiment may be combined with any other aspect/embodiment unless indicated to the contrary. Moreover, the invention is not restricted to the described embodiments, but may be varied within the scope of the accompanying patent claims.

The invention claimed is:

1. A combination of a bearing component and a sensor, wherein:
    (a) at least a portion of the bearing component is formed from a bearing steel;
    (b) the sensor comprises a sensor element and a support therefor;
    (c) at least a portion of the support is formed from a low carbon steel comprising no more than 0.2 wt. % carbon or from nickel or an alloy thereof or from titanium or an alloy thereof; and
    (d) the bearing component and the support are welded to one another via said respective portions, and wherein nickel or a nickel-containing composition is used in the formation of the weld between said respective portions.

2. A combination as claimed in claim 1, wherein the bearing steel comprises at least 0.4 wt. % carbon.

3. A combination as claimed in claim 2, wherein the bearing steel comprises from 0.5 to 0.8 wt. % carbon.

4. A combination as claimed in claim 3, wherein the bearing steel comprises from 0.5 to 0.6 wt. % carbon.

5. A combination as claimed in claim 3, wherein the bearing steel comprises from 0.65 to 0.75 wt. % carbon.

6. A combination as claimed in claim 2, wherein the bearing steel comprises at least 0.8 wt. % carbon.

7. A combination as claimed in claim 6, wherein the bearing steel comprises from 0.7 to 1.3 wt. % carbon.

8. A combination as claimed in claim 7, wherein the bearing steel comprises from 0.8 to 1.2 wt. % carbon.

9. A combination as claimed in claim 1, wherein the bearing steel comprises up to 2 wt. % chromium.

10. A combination as claimed in claim 9, wherein the bearing steel comprises from 1.2 to 1.8 wt. % chromium.

11. A combination as claimed in claim 10, wherein the bearing steel comprises from 1.3 to 1.6 wt. % chromium.

12. A combination as claimed in claim 1, wherein the support is formed from a stainless steel.

13. A combination as claimed in claim 1, wherein the support is formed from a low carbon steel comprising no more than 0.1 wt. % carbon.

14. A combination as claimed in claim 13, wherein the low carbon steel comprises no more than 0.08 wt. % carbon.

15. A combination as claimed in claim 14, wherein the low carbon steel comprises no more than 0.05 wt. % carbon.

16. A combination as claimed in claim 12, wherein the low carbon steel comprises from 10 to 25 wt. % chromium.

17. A combination as claimed in claim 16, wherein the low carbon steel comprises from 12 to 20 wt. % chromium.

18. A combination as claimed in claim 17, wherein the low carbon steel comprises from 13 to 19 wt. % chromium.

19. A combination as claimed claim 1, wherein the support is formed from a low carbon steel comprising from 2 to 16 wt. % nickel.

20. A combination as claimed in claim 19, wherein the low carbon steel comprises from 7 to 15 wt. % nickel.

21. A combination as claimed in claim 19, wherein the low carbon steel comprises from 3 to 5 wt. % nickel.

22. A bearing comprising a combination as claimed in claim 1.

23. A combination as claimed in claim 1, wherein the nickel or nickel-containing composition is provided as filler material during the welding operation.

24. A combination as claimed in claim 1, wherein the nickel or nickel-containing composition is pre-deposited on one or both of the respective portions of the bearing component and the support prior to the welding operation.

25. A combination as claimed claim 1, wherein the support is formed from electrodeposited and etched nickel.

26. A combination as claimed in claim 1, wherein one or more dielectric layers is/are interposed between the sensor element and the support.

27. A combination as claimed in claim 26, wherein at least one of the one or more dielectric layers is a glass or glass-containing composition.

28. A combination as claimed in claim 1, wherein the sensor is a displacement sensor comprising one or more strain gauges.

29. A combination as claimed in claim 28, wherein the one or more strain gauges are formed from a resistor material or a semiconductor material.

30. A combination as claimed in claim 29, wherein the resistor material comprises one or more of ruthenium oxide, tantalum nitride, lead oxide, bismuth ruthenate, bismuth iridate and is deposited as thick or thin film on the support.

31. A combination as claimed in claim 29, wherein the strain gauge is formed in a silicon substrate and wherein the silicon substrate is sinter bonded to the support using a glass or glass-containing composition.

32. A combination as claimed in claim 1, wherein the bearing component is an inner or outer raceway.

* * * * *